United States Patent
Lin

(10) Patent No.: US 8,275,928 B2
(45) Date of Patent: Sep. 25, 2012

(54) MEMORY MODULE AND METHOD FOR PERFORMING WEAR-LEVELING OF MEMORY MODULE USING REMAPPING, LINK, AND SPARE AREA TABLES

(75) Inventor: Chien-Cheng Lin, Yilan County (TW)

(73) Assignee: Silicon Motion, Inc., Hsinchu County (TW)

( * ) Notice: Subject to any disclaimer, the term of this patent is extended or adjusted under 35 U.S.C. 154(b) by 1010 days.

(21) Appl. No.: 12/121,108

(22) Filed: May 15, 2008

(65) Prior Publication Data

US 2009/0287875 A1  Nov. 19, 2009

(51) Int. Cl.
    *G06F 12/00* (2006.01)
(52) U.S. Cl. ......... 711/103; 711/154; 711/165; 711/170
(58) Field of Classification Search .................. 711/103, 711/154, 165, 170
    See application file for complete search history.

(56) References Cited

U.S. PATENT DOCUMENTS

| 6,230,233 | B1 * | 5/2001 | Lofgren et al. | 711/103 |
| 7,315,917 | B2 * | 1/2008 | Bennett et al. | 711/103 |
| 7,454,592 | B1 * | 11/2008 | Shah et al. | 711/216 |
| 7,797,481 | B2 * | 9/2010 | Lee et al. | 711/103 |
| 7,873,837 | B1 * | 1/2011 | Lee et al. | 713/189 |
| 2004/0210706 | A1 * | 10/2004 | In et al. | 711/103 |
| 2006/0106972 | A1 * | 5/2006 | Gorobets et al. | 711/103 |

* cited by examiner

*Primary Examiner* — Arpan P. Savla
(74) *Attorney, Agent, or Firm* — Thomas|Kayden

(57) ABSTRACT

The invention comprises a memory module capable of wear-leveling. In one embodiment, the memory module comprises a flash memory and a controller. The flash memory comprises a plurality of management units, wherein each of the management units comprises a plurality of blocks. The controller receives new data with a logical address managed by a first management unit selected from the management units, pops a first spare block from a spare area of the first management unit, determines whether an erase count of the first spare block is greater than a first threshold value, searches a second management unit selected from the management units for a replacing block with an erase count lower than a second threshold value when the erase count of the first spare block is greater than the first threshold value, and directs the first management unit and the second management unit to exchange the first spare block with the replacing block.

18 Claims, 10 Drawing Sheets

MEMORY MODULE AND METHOD FOR PERFORMING WEAR-LEVELING OF MEMORY MODULE USING REMAPPING, LINK, AND SPARE AREA TABLES

BACKGROUND OF THE INVENTION

1. Field of the Invention

The invention relates to memory modules, and more particularly to wear-leveling of memory modules.

2. Description of the Related Art

A flash memory of a memory module is composed of a plurality of blocks capable of storing data. Because the number of the blocks of a flash memory is large, the blocks are divided into a plurality of groups for management convenience. Each group has a reduced number of blocks and is managed by a management unit. A flash memory therefore comprises a plurality of management units respectively managing a number of blocks of the flash memory.

Referring to FIG. 1, a block diagram of a computer system 100 is shown. The computer system 100 comprises a host 102 and a memory module 104 storing data of the host 102. The memory module 104 comprises a controller 112 and a flash memory 114. When the host 102 requests the memory module 104 to store data, the controller 112 receives data from the host 102 and stores data into the flash memory 114. When the host 102 requests the memory module 104 to retrieve data, the controller 112 retrieves data from the flash memory 114 and delivers data to the host 102. The flash memory 114 comprises a plurality of management units 121~12N. Each of the management units 121~12N manages a fixed number of blocks capable of storing data.

Before new data is stored to a block which has stored data therein, a controller 112 must erase the block in advance. Blocks of a flash memory therefore are erased again and again during the operating lifespan of the flash memory. Additionally, there is a limit as to the number of times a block of a flash memory can be erased, before operation is negatively effected. The controller of a memory module therefore must count the number of times a block of a flash memory is erased; the process is referred to as an erase count of the block. When a block with an erase count greater than a threshold is programmed with data, the block will not be accurately programmed and errors may occur in reading data from the block.

Thus, a controller must manage programming of the blocks of a flash memory by equally programming the blocks of a flash memory. A technique for equally programming blocks of a flash memory is referred to as "wear-leveling". However, while blocks of a flash memory are respectively managed by a plurality of management units, conventional wear-leveling only equally program blocks of each management unit, separately. Thus, blocks of different management units will have different number of times of erasing. Specifically, some management units may have blocks with high erasing counts and other management units may have blocks with low erasing counts. Thus, a method for performing wear-leveling between different management units of a flash memory is required.

BRIEF SUMMARY OF THE INVENTION

The invention comprises a memory module capable of wear-leveling. In one embodiment, the memory module comprises a flash memory and a controller. The flash memory comprises a plurality of management units, wherein each of the management units comprises a plurality of blocks. The controller receives new data with a logical address managed by a first management unit selected from the management units, pops a first spare block from a spare area of the first management unit, determines whether an erase count of the first spare block is greater than a first threshold value, searches a second management unit selected from the management units for a replacing block with an erase count lower than a second threshold value when the erase count of the first spare block is greater than the first threshold value, and directs the first management unit and the second management unit to exchange the first spare block and the replacing block.

The invention further provides a method for performing wear-leveling in a memory module. In one embodiment, the memory module comprises a flash memory comprising a plurality of management units, and each of the management units comprises a plurality of blocks. First, new data with a logical address managed by a first management unit selected from the management units is received. A first spare block is then popped from a spare area of the first management unit. Whether an erase count of the first spare block is greater than a first threshold value is then determined. A second management unit selected from the management units is then searched for a replacing block with an erase count lower than a second threshold value when the erase count of the first spare block is greater than the first threshold value. Finally, the first management unit and the second management unit are made to exchange the first spare block and the replacing block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
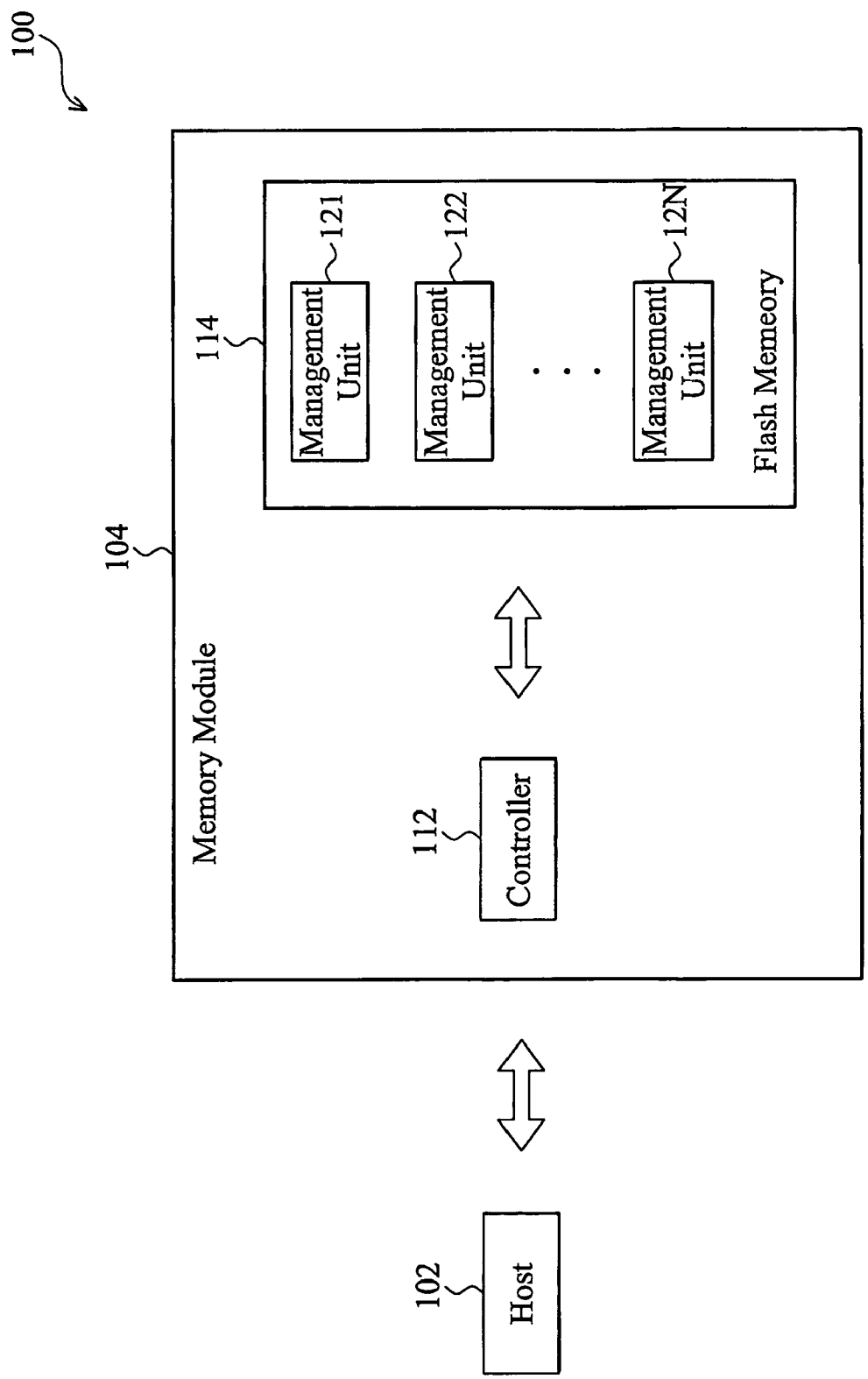
FIG. 1 is a block diagram of a computer system.
Figure 2:
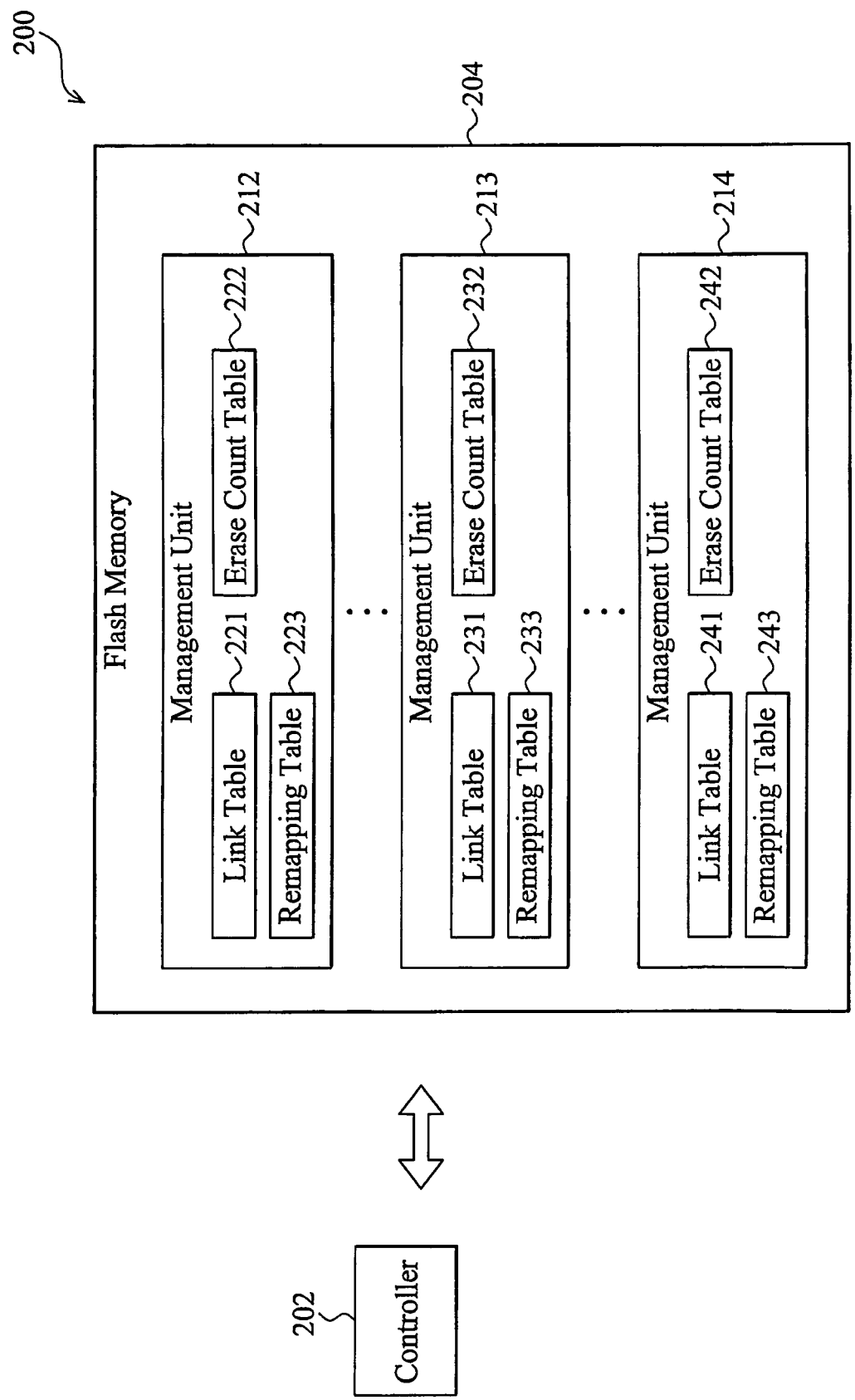
FIG. 2 is a block diagram of a memory module capable of wear-leveling according to the invention.

Referring to FIG. 2, a block diagram of a memory module 200 capable of wear-leveling according to the invention is shown. The memory module 200 comprises a controller 202 and a flash memory 204. The flash memory 204 comprises a plurality of management units 212~214. Each of the management units 212~214 manages programming and erasing of a plurality of blocks. In addition, each of the management units 212~214 comprises a link table, an erase count table, and a remapping table. A link table of a management unit stores a corresponding relationship between a plurality of logical addresses of stored data and a plurality of indexes of blocks holding the stored data. A remapping table of a management unit stores a corresponding relationship between a plurality of physical addresses of blocks of the management unit and a plurality of indexes of the blocks. An erase count table of a management unit stores a corresponding relationship between a plurality of indexes of blocks of the management unit and a plurality of erase counts of the blocks.

Figure 4A:
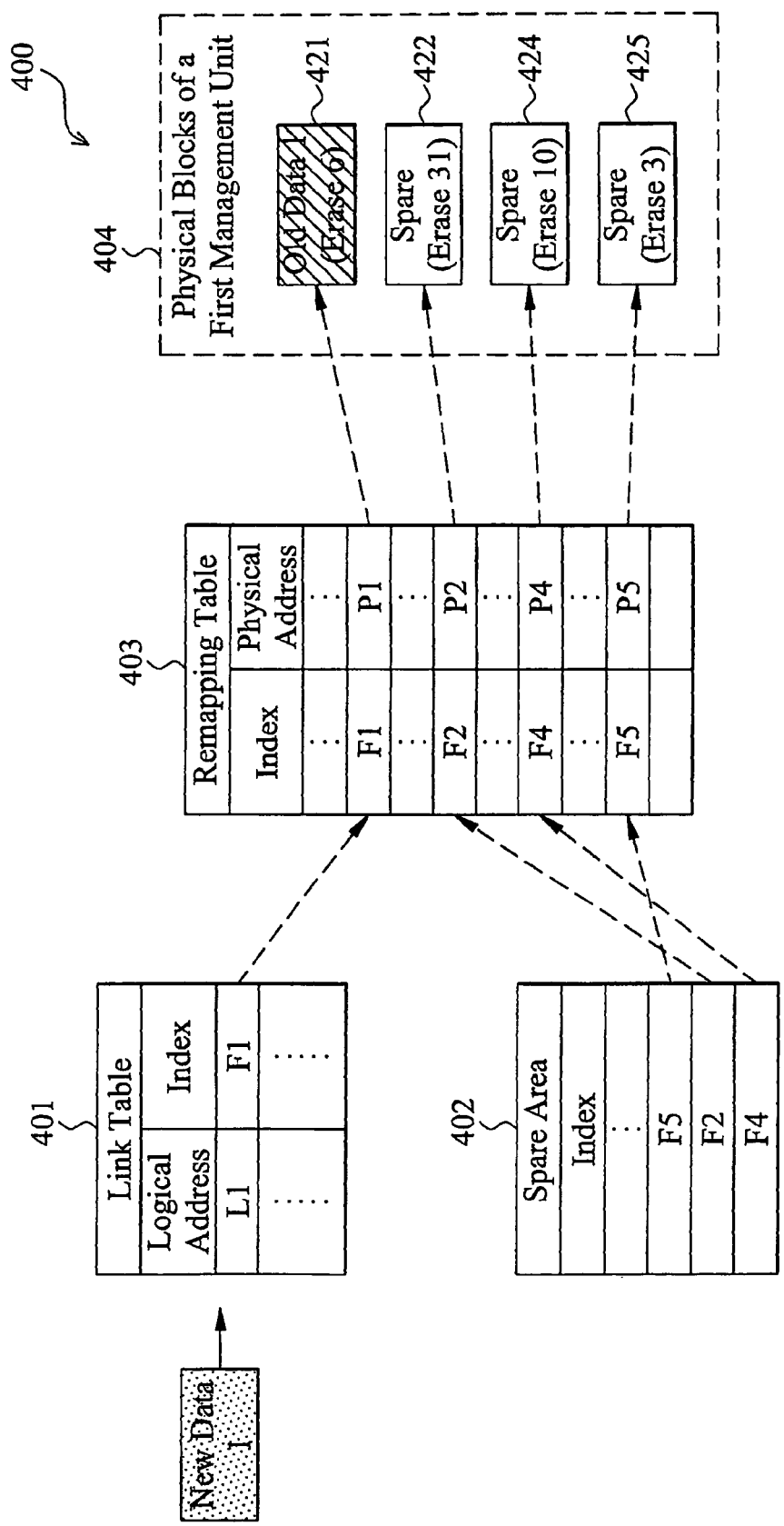
FIG. 4A shows an embodiment of tables of a first management unit of a flash memory according to the invention.

Referring to FIG. 4A, an embodiment of tables of a first management unit 400 of the flash memory 204 according to the invention is shown. The first management unit 400 manages a plurality of blocks 404. Blocks of a management unit are classified into two categories, blocks storing data and blocks storing no data. The blocks storing data are referred to as used blocks, and the blocks storing no data are referred to as spare blocks. The blocks 404 of the first management unit 400 include a used block 421 and three spare blocks 422, 424, and 425. Erase counts of the blocks 421, 422, 424, and 425 are respectively 6, 30, 10, and 3. A remapping table 403 of the first management unit 400 stores physical addresses of all blocks of the first management unit 400 according to a series of indexes. For example, a physical address P1 of the used block 421 is stored in the remapping table 403 according to an index F1. In addition, physical addresses P2, P4, and P5 of the spare blocks 422, 424, and 425 are respectively stored in the remapping table 403 according to indexes F2, F4, and F5. Used blocks of the first management unit 400 can be found in a link table 401 of the first management unit 400. For example, the link table 401 registers the index F1 of the used block 421 and a logical address L1 of the data stored in the block 421. Spare blocks of the first management unit 400 can be found in a spare area 402 of the first management unit 400. For example, the spare area 402 registers the indexes F5, F2, and F4 of the spare blocks 425, 422, and 424.

Figure 4B:
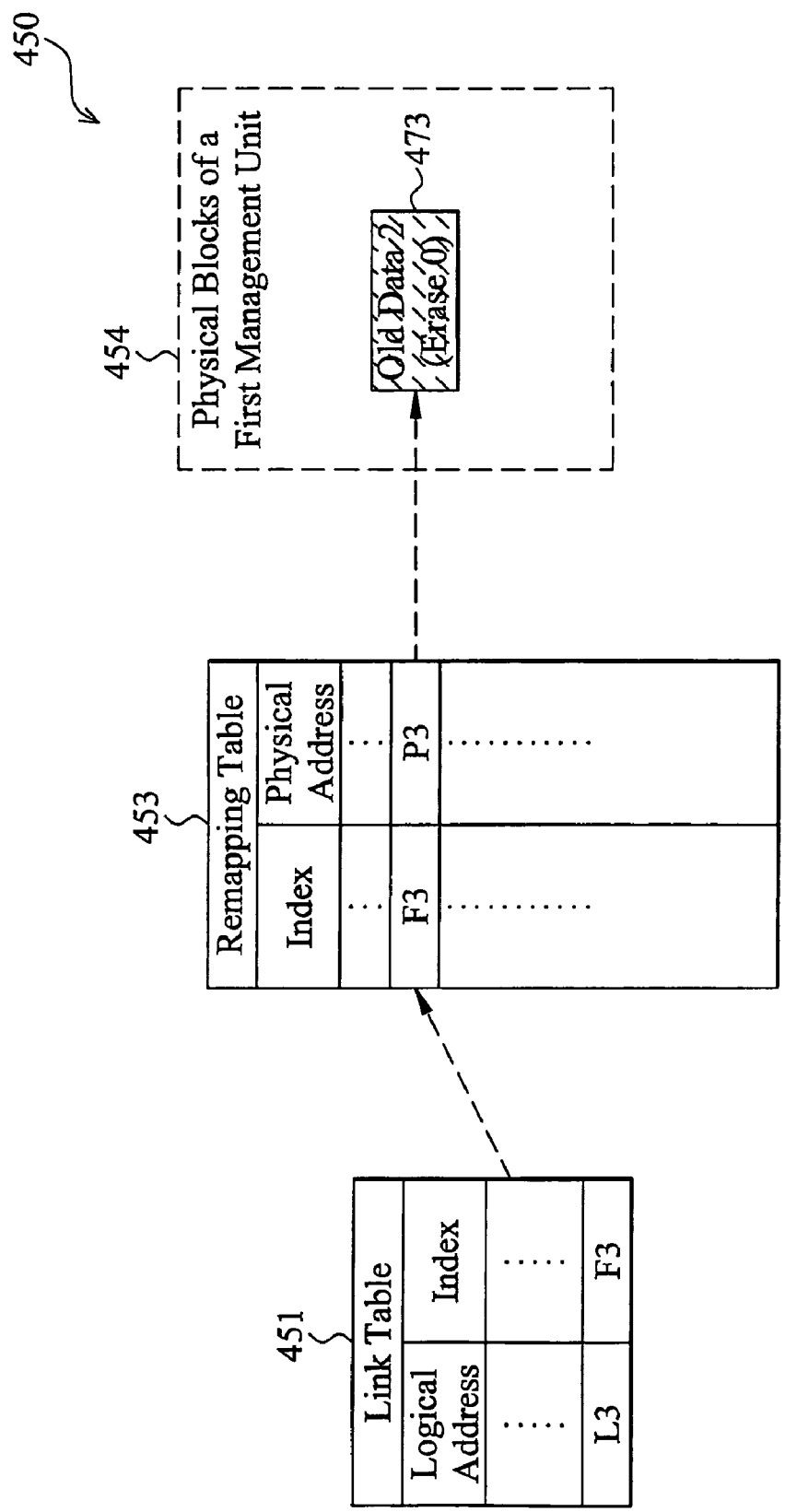
FIG. 4B shows an embodiment of tables of a second management unit of a flash memory according to the invention.

Referring to FIG. 4B, an embodiment of tables of a second management unit 450 of the flash memory 204 according to the invention is shown. The second management unit 450 manages a plurality of blocks 454 including a used block 473. An erase count of the block 473 is 0. A remapping table 453 of the second management unit 450 stores physical addresses of all blocks of the second management unit 450 according to a series of indexes. For example, a physical address P3 of the used block 473 is stored in the remapping table 453 according to an index F3. In addition, used blocks of the second management unit 450 can be found in a link table 451 of the second management unit 450. For example, the link table 451 registers the index F3 of the used block 473 and a logical address L3 of the data stored in the block 473.

Figure 3A:
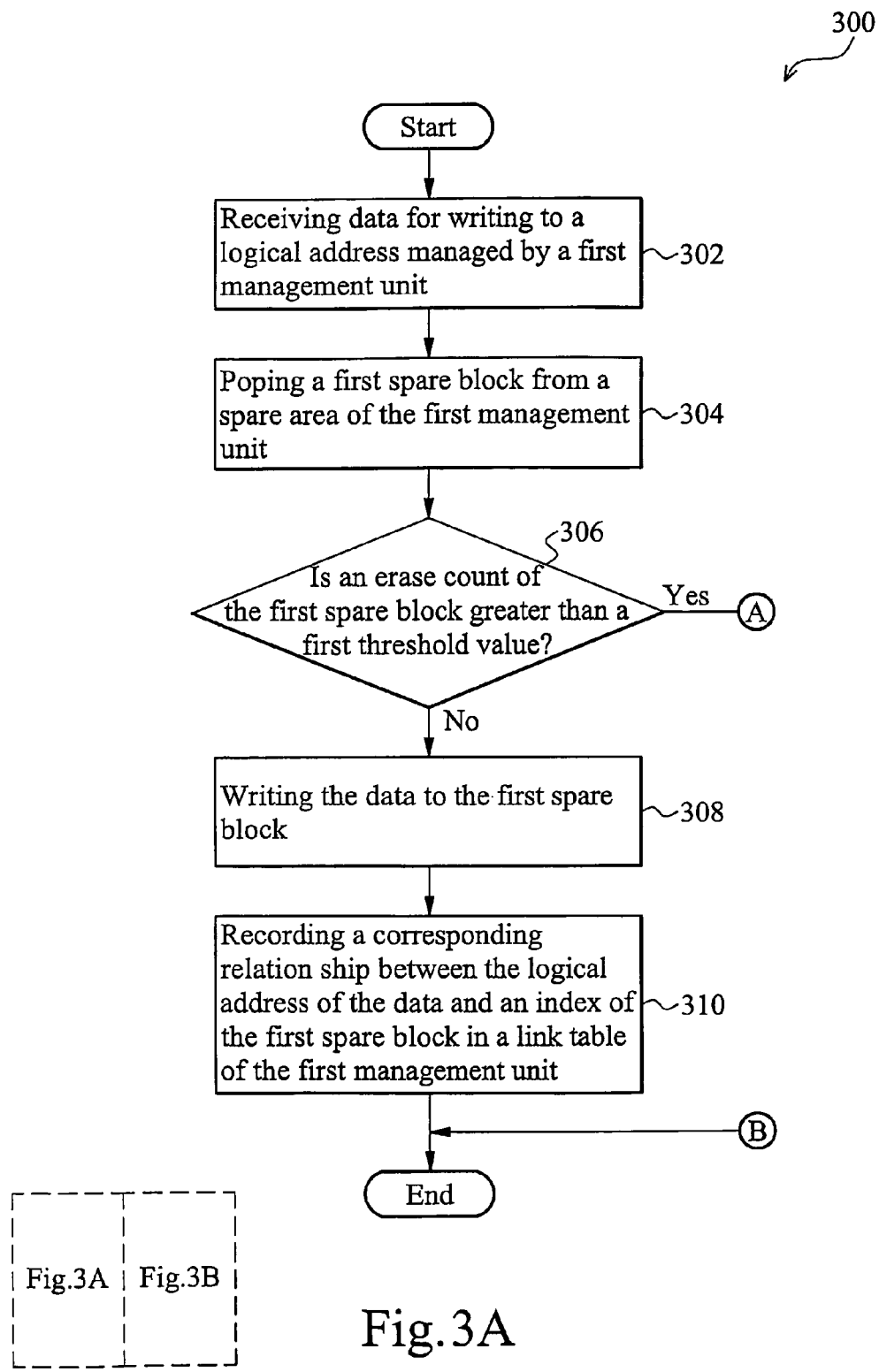
FIG. 3 is a flowchart of a method for performing wear-leveling according to the invention.
Figure 3B:
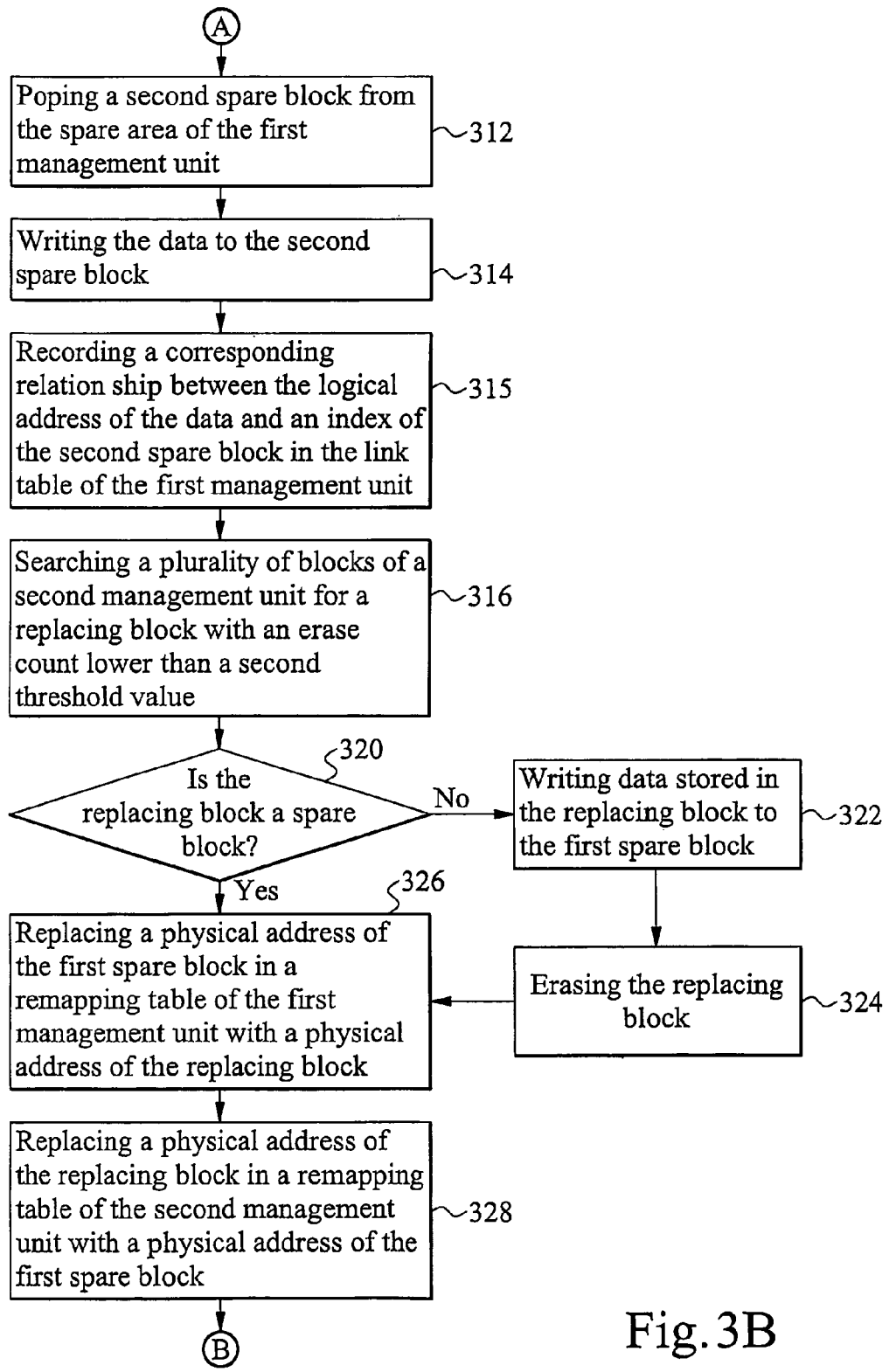

Referring to FIG. 3, a flowchart of a method 300 for performing wear-leveling according to the invention is shown. The memory module 200 is coupled to a host and programs the flash memory 204 according to instructions of the host. Assume that the host requests the memory module 200 to update data stored therein. First, the controller 202 receives data for writing to a logical address L1 managed by the first management unit 400 of the flash memory 204 from a host (step 302). The controller 202 then pops a spare block 424 with the index F4 from the spare region 402 of the first management unit 400 (step 304). The controller 202 then determines an erase count of the spare block 424. In one embodiment, the controller 202 finds the erase count of the spare block 424 in an erase count table of the first management unit 400.

Figure 5:
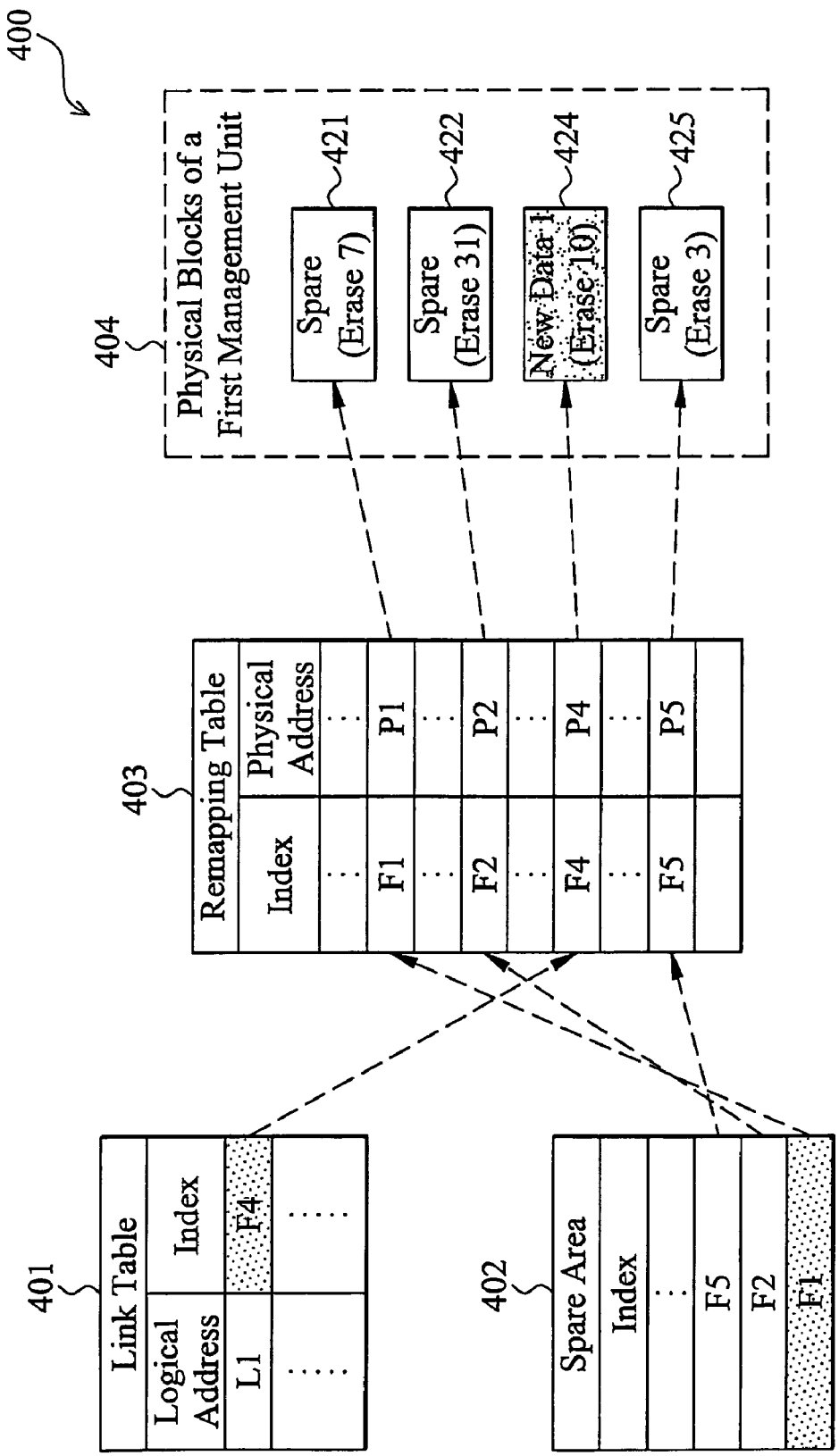
FIG. 5 shows amendments in the tables of the first management unit of FIG. 4A.

Assume that the erase count of the spare block 424 is 10. The controller 202 then determines whether the erase count of the spare block 424 is greater than a first threshold value (step 306). Assume that the first threshold value is 30, and the erase count 10 of the spare block 424 is less than the first threshold value 30. The controller 202 then writes the new data received from the host to the spare block 424 (step 308), as shown in FIG. 5. The controller 202 then changes an index of a block storing data with the logical address L1 in the link table 401 from the index F1 of an original block 421 to the index F4 of the spare block 424 (step 310), as shown in FIG. 5. The original block 421 is then erased, and the index F1 of the original block 421 is then stored in the spare area 402.

Figure 6:
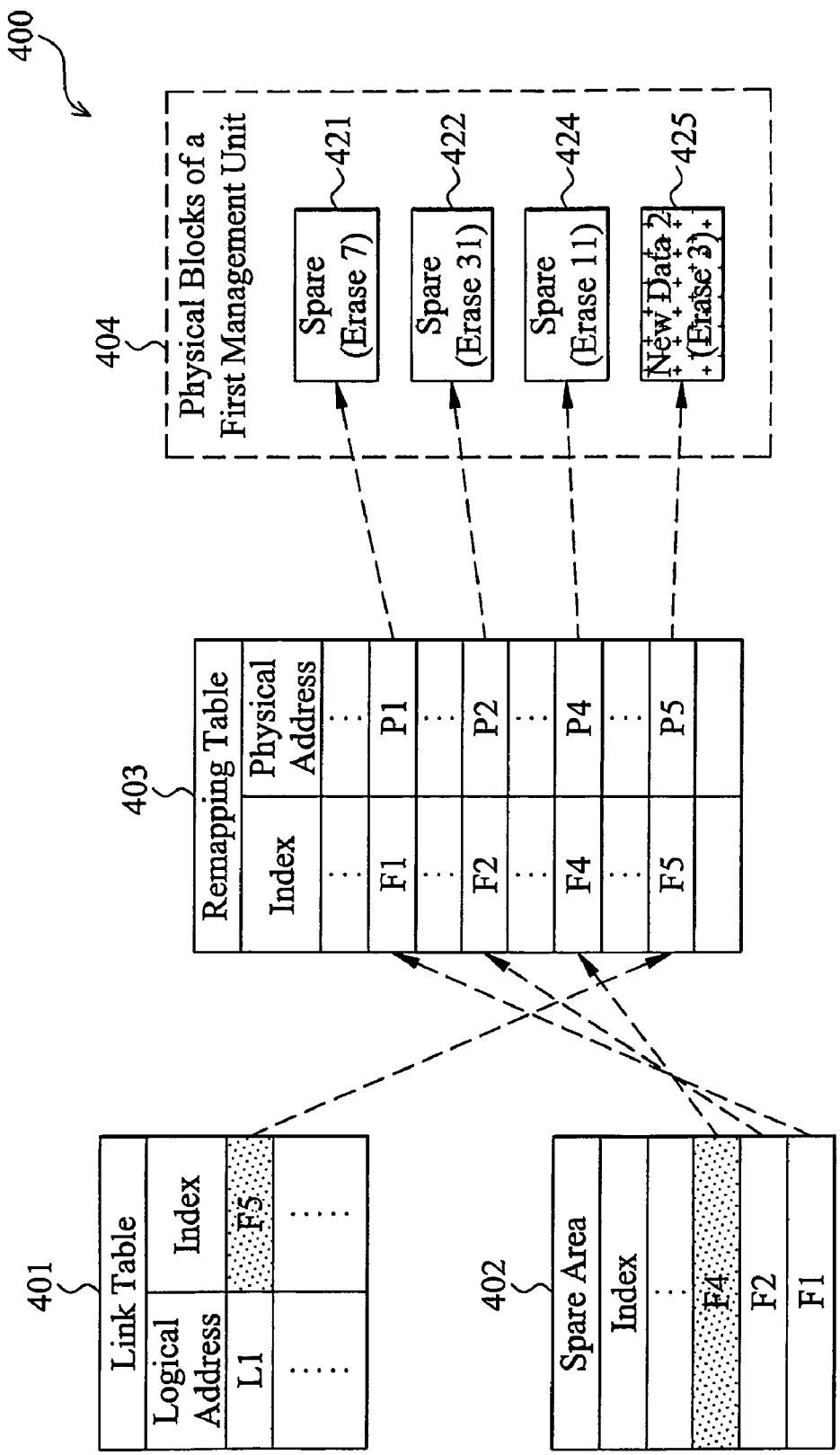
FIG. 6 shows amendments in the tables of the first management unit of FIG. 5.

Assume that the host requests the memory module 200 to write another new data to the logical address L1 again. The controller 202 then receives the new data from the host (step 302), and pops a first spare block 422 with an index F2 from the spare area 402 (step 304). The controller 202 then determines whether an erase count of the first spare block 422 is greater than the threshold value (step 306). Because the first spare block 422 has an erase count of 31 which is greater than the threshold value of 30, the controller 202 pops a second spare block 425 with an index F5 from the spare region 402 of the first management unit 400 (step 312). The controller 202 then writes the new data to the second spare block 425 (step 314), and then changes an index of a block storing data with the logical address L1 in the link table 401 from the index F4 of an original block 424 to the index F5 of the second spare block 425 (step 315), as shown in FIG. 6. The original block 424 is then erased, and the index F4 of the original block 424 is then stored in the spare area 402.

Because the controller 202 determines that the first spare block 422 has an erase count greater than a threshold 30, wear-leveling between a plurality of management units is then performed. The controller 202 then searches a plurality of blocks of the second management unit 450 for a replacing block with an erase count lower than a second threshold value (step 316). In one embodiment, the second threshold value is a half of the first threshold value and equal to 15. Assume that the controller 202 finds the block 473 of the second management unit 450 as the replacing block, and the block 473 has an erase count of 0. The controller 202 then determines whether the replacing block 473 is a spare block (step 320). Because the replacing block 473 is not a spare block, the controller 202 writes data stored in the replacing block 473 to the first spare block 422 (step 322), and then erases the replacing block 473 (step 324), as shown in FIG. 7A.

Figure 7A:
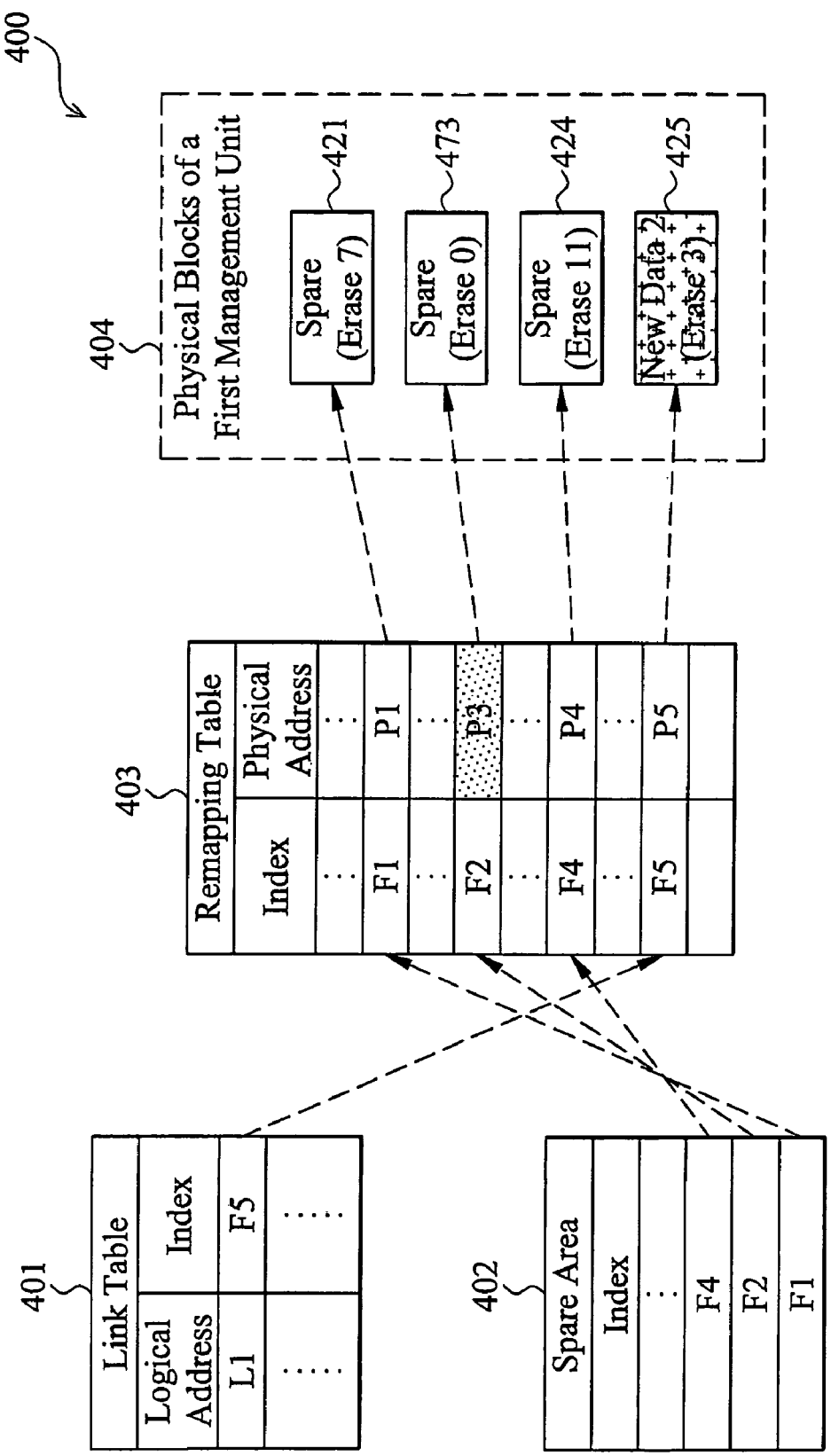
FIG. 7A shows amendments in the tables of the first management unit of FIG. 6 after wear-leveling is performed.
Figure 7B:
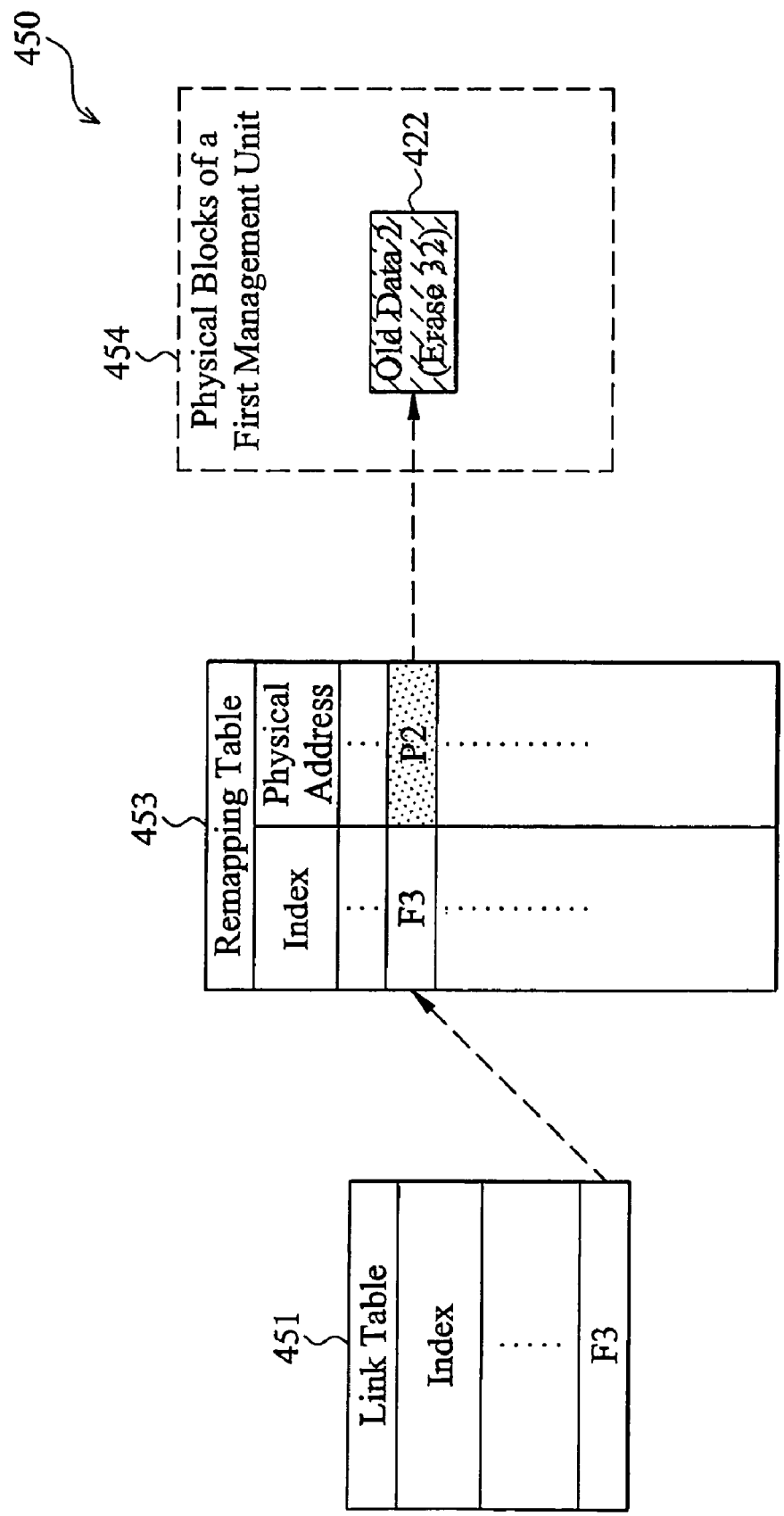
FIG. 7B shows amendments in the tables of the second management unit of FIG. 4B after wear-leveling is performed.

The controller 202 then replaces a physical address P2 of the first spare block 422 in the remapping table 403 of the first management unit 400 with a physical address P3 of the replacing block 473 (step 326), as shown in FIG. 7A. In addition, the controller 202 also replaces the physical address P3 of the replacing block 473 in the remapping table 453 of the second management unit 450 with the physical address P2 of the first spare block 422 (step 328), as shown in FIG. 7B. Because the remapping table 403 and 453 respectively hold physical addresses of all blocks of the first management unit 400 and the second management unit 450, amendment of the remapping tables 403 and 453 in steps 326 and 328 directs the first management unit 400 and the second management unit 450 to exchange the first spare block 422 and the replacing block 473. Thus, after the wear-leveling of steps 320~328 is performed, the first spare block 422 with a high erase count of 32 belongs to the second management unit 450 with less programming frequency, and the replacing block 473 with a low erase count of 0 belongs to the first management unit 400 with high programming frequency.

Thus, when the blocks of the first management unit 400 have an erase count greater than the first threshold value, the blocks of the first management unit 400 are exchanged with the replacing blocks of the second management unit 450, wherein the replacing blocks have an erase count lower than a second threshold value. The erase counts of blocks of the first management unit 400 therefore can be lowered even if the host frequently programs new data to the blocks of the first management unit 400. If the erase counts of all blocks of the second management unit 450 are greater than the second threshold value, the controller 202 would not find a replacing block in the blocks of the second management unit 450 at step 316. The controller 202 would then search a plurality of blocks of a third management unit other than the second management unit 450 for the replacing block. In addition, if the controller 202 cannot find a replacing block in the blocks of all management units of the flash memory 204, the controller 202 would subtract the second threshold value from all the erase counts of the blocks of the flash memory 204, and then continue searching for the replacing block.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory module capable of wear-leveling, comprising:
   a flash memory, comprising a plurality of management units, wherein each of the management units comprises a plurality of blocks; and
   a controller, receiving new data with a logical address managed by a first management unit selected from the management units, popping a first spare block from a spare area of the first management unit, determining whether an erase count of the first spare block is greater than a first threshold value, searching a second management unit selected from the management units for a replacing block with an erase count lower than a second threshold value when the erase count of the first spare block is greater than the first threshold value, and directing the first management unit and the second management unit to exchange the first spare block and the replacing block;
   wherein each of the management units has a remapping table storing a first corresponding relationship between a plurality of physical addresses and a plurality of indexes corresponding to all of the blocks of the management unit, and each of the management units further has a link table storing a second corresponding relationship between a plurality of logical addresses of stored data and a first portion of the indexes corresponding to the blocks holding the stored data, and a spare area table storing a second portion of the indexes corresponding to the blocks storing no data.

2. The memory module as claimed in claim 1, wherein when the erase count of the first spare block is greater than the first threshold value, the controller pops a second spare block from the spare area of the first management unit, writes the new data to the second spare block, and then modifies a link table of the first management unit with the second corresponding relationship between a logical address of the new data and an index corresponding to the second spare block.

3. The memory module as claimed in claim 1, wherein when the erase count of the first spare block is greater than the first threshold value, the controller determines whether the replacing block is a spare block, and when the replacing block is not a spare block, the controller writes data stored in the replacing block to the first spare block, and then erases the replacing block, thus directing the first management unit and the second management unit to exchange the first spare block and the replacing block.

4. The memory module as claimed in claim 1, wherein when the erase count of the first spare block is greater than the first threshold value, the controller replaces a physical address of the first spare block in the first corresponding relationship of a remapping table of the first management unit with a physical address of the replacing block, and then replaces a physical address of the replacing block in the first corresponding relationship of a remapping table of the second management unit with a physical address of the first spare block, thus directing the first management unit and the second management unit to exchange the first spare block and the replacing block.

5. The memory module as claimed in claim 1, wherein when the erase count of the first spare block is not greater than the first threshold value, the controller writes the new data to the first spare block, and modifies a link table of the first management unit with the second corresponding relationship between a logical address of the new data and an index corresponding to the first spare block.

6. The memory module as claimed in claim 1, wherein each of the management units also has an erase count table storing a third corresponding relationship between the plurality of indexes of the blocks and a plurality of erase counts of the blocks.

7. The memory module as claimed in claim 1, wherein the second threshold value is a half of the first threshold value.

8. The memory module as claimed in claim 1, wherein the flash memory is a NAND flash memory.

9. The memory module as claimed in claim 1, wherein when the erase counts of all blocks of the second management unit are greater than the second threshold value, the controller searches a plurality of blocks of a third management unit other than the second management unit for the replacing block.

10. A method for performing wear-leveling in a memory module, wherein the memory module comprises a flash memory comprising a plurality of management units, and each of the management units comprises a plurality of blocks, comprising:
    receiving new data with a logical address managed by a first management unit selected from the management units;
    popping a first spare block from a spare area of the first management unit;
    determining whether an erase count of the first spare block is greater than a first threshold value;
    searching a second management unit selected from the management units for a replacing block with an erase count lower than a second threshold value when the erase count of the first spare block is greater than the first threshold value; and
    directing the first management unit and the second management unit to exchange the first spare block and the replacing block;
    wherein each of the management units has a remapping table storing a first corresponding relationship between a plurality of physical addresses and a plurality of indexes corresponding to all of the blocks of the management unit, and each of the management units further has a link table storing a second corresponding relationship between a plurality of logical addresses of stored data and a first portion of the indexes corresponding to the blocks holding the stored data, and a spare area table storing a second portion of the indexes corresponding to the blocks storing no data.

11. The method as claimed in claim 10, wherein the method further comprises:
popping a second spare block from the spare area of the first management unit when the erase count of the first spare block is greater than the first threshold value;
writing the new data to the second spare block; and
modifying a link table of the first management unit with the second corresponding relationship between a logical address of the new data and an index corresponding to the second spare block.

12. The method as claimed in claim 10, wherein exchange of the first spare block and the replacing block comprises:
determining whether the replacing block is a spare block;
writing data stored in the replacing block to the first spare block when the replacing block is not a spare block; and
erasing the replacing block when the replacing block is not a spare block.

13. The method as claimed in claim 10, wherein exchange of the first spare block and the replacing block further comprises:
replacing a physical address of the first spare block in the first corresponding relationship of a remapping table of the first management unit with a physical address of the replacing block; and
replacing a physical address of the replacing block in the first corresponding relationship of a remapping table of the second management unit with a physical address of the first spare block.

14. The method as claimed in claim 10, wherein the method further comprises:
when the erase count of the first spare block is not greater than the first threshold value, writing the new data to the first spare block; and
modifying a link table of the first management unit with the second corresponding relationship between a logical address of the new data and an index corresponding to the first spare block.

15. The method as claimed in claim 10, wherein each of the management units also has an erase count table storing a third corresponding relationship between the plurality of indexes of the blocks and a plurality of erase counts of the blocks.

16. The method as claimed in claim 10, wherein the second threshold value is a half of the first threshold value.

17. The method as claimed in claim 10, wherein the flash memory is a NAND flash memory.

18. The method as claimed in claim 10, wherein the method further comprises searching a plurality of blocks of a third management unit other than the second management unit for the replacing block when the erase counts of all blocks of the second management unit are greater than the second threshold value.

* * * * *